United States Patent [19]

Nicholas

[11] Patent Number: 4,765,082

[45] Date of Patent: Aug. 23, 1988

[54] FISHHOOK TYING TOOL

[76] Inventor: Ben A. Nicholas, 9551 Sierra Dr., Arvada, Colo. 80005

[21] Appl. No.: 91,100

[22] Filed: Aug. 31, 1987

[51] Int. Cl.$^4$ ............................................. A01K 97/00
[52] U.S. Cl. ...................................................... 43/4
[58] Field of Search ...................... 43/4, 4.5, 1; 289/17

[56] References Cited

U.S. PATENT DOCUMENTS

| | | | |
|---|---|---|---|
| 1,653,335 | 12/1927 | Bettum . | |
| 2,530,713 | 11/1950 | Martinez | 81/18 |
| 2,926,036 | 2/1960 | Wimberley | 289/17 |
| 2,934,369 | 4/1960 | Kennedy | 289/17 |
| 3,086,802 | 4/1963 | Keeton | 289/17 |
| 3,101,964 | 8/1963 | Reaser | 289/17 |
| 3,252,724 | 5/1966 | Kearns | 287/17 |
| 3,396,998 | 8/1968 | Scoville | 289/17 |
| 3,401,967 | 9/1968 | Glowka | 289/17 |
| 3,402,957 | 9/1968 | Peterson | 289/17 |
| 3,575,449 | 4/1971 | Browning | 289/17 |
| 3,588,078 | 6/1971 | Van De Sande | 269/6 |
| 3,625,556 | 12/1971 | Stromberg | 289/17 |
| 3,965,605 | 6/1976 | Allen | 43/1 |
| 4,029,346 | 6/1977 | Browning | 289/17 |
| 4,660,314 | 4/1987 | Janssen | 43/1 |

FOREIGN PATENT DOCUMENTS 2037356 1/1972 Fed. Rep. of Germany ............ 43/4

*Primary Examiner*—Gene P. Crosby

[57] ABSTRACT

A hand held device for safely holding a fish hook or small component while a line or leader is attached, having a tapered, slotted pen barrel shaped member (10), which encloses a coil spring (30), which in turn encloses the sharp portion of a hook, a cap (10a) with an adapted pocket clip (20) and a line cutter (21). The device safely assists in attaching line to a fish hook or small component faster than prior methods and produces a knot that is stronger because the line is attached with two wraps of line through the eye of a fish hook.

1 Claim, 1 Drawing Sheet

U.S. Patent  Aug. 23, 1988  4,765,082
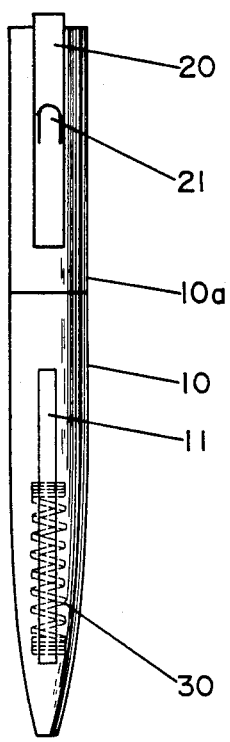
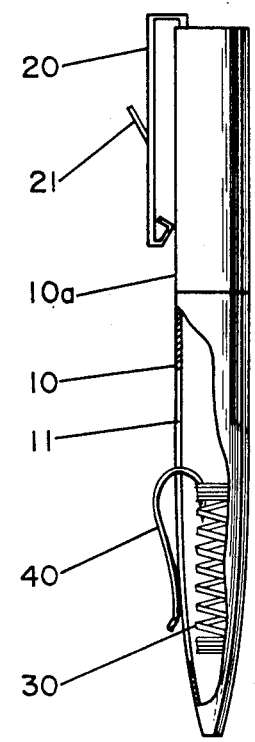
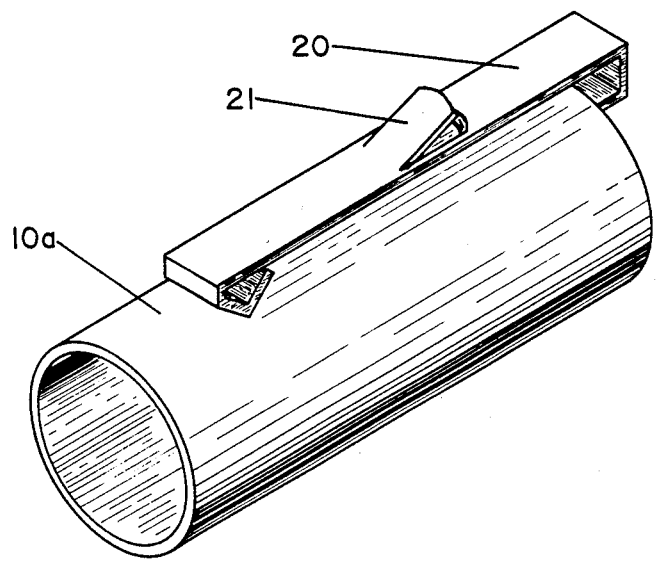

FISHHOOK TYING TOOL

BACKGROUND—FIELD OF INVENTION

Several different small portable devices have been devised for holding a fish hook or small component while a line or leader is attached. The common objection of all the prior art is that they leave the sharp barbed part of the hook exposed during the line attachment task. The device of this invention provides several advantages over the prior art. The sharp barbed part of the hook is not exposed during the line attachment task, and in addition the user receives a faster more secure knot.

BACKGROUND—DISCUSSION OF PRIOR ART

Heretofore these small portable devices held the fish hook or small component in a spring like or jaw like clamp as in U.S. Pat. No. 1,653,335 to Bettum, 12/1927. A retractable wire hook that extended out from a barrel shaft of a ball point pen was used by U.S. Pat. No. 3,588,078 to Van De Sande, 6/1971. All of the prior art that I am aware of share this common fault of exposing the sharp barbed portion of the hook during the attachment task. Although these devices are capable of holding a hook securely, they also provided the user with the unfortunate opportunity of implanting the hook into himself.

OBJECTS AND ADVANTAGES

Accordingly several objects and advantages of my invention are safety, a faster more secure knot, portability, and a convenient line cutter.

This invention provides a young or novice fisherman the ability to safely attach a fish hook or small component to a line while eliminating the possibility of self injury.

Common tying methods only produce a single wrap of line through the eye of a fish hook. Using this invention with the prescribed tying method, the user receives a knot that is attached by two wraps of line through the eye of a fish hook.

Portability becomes apparent because its size is no larger than that of a common ball point pen. It can be attached to a shirt pocket by the clip in the same manner as a ball point pen.

The pocket clip has a raised angular flute, for cutting the excess fishing line after the line tying task is finished. The flute is similar to the device used for cutting dental floss from it's dispenser.

DRAWING FIGURES

FIG. 1 shows a front view of the fishhook tying tool.

FIG. 2 shows a sectional side view of the fishhook tying tool with the sharp barbed part of the hook inserted into the coil spring.

FIG. 3 shows a top-sectional perspective view of the Cap and Pocket Clip/Line Cutter.

DRAWING REFERENCE NUMERALS

10 Barrel Shaft
10a Cap
11 Hook Slot
20 Pocket Clip
21 Line Cutter
30 Coil Spring
40 Hook

DESCRIPTION

FIGS. 1-3 shows the fishhook tying tool consisting of a configuration which is similar to that of a conventional ballpoint pen. The device is comprised of an upper cap 10a, which has secured thereto a pocket clip 20, with an incorporated line cutter 21. The lower barrel shaft 10, and its incorporated hook slot 11, are shown housing an enclosed coil spring 30. The upper cap 10a and the lower barrel shaft 10, are fastened together in a conventional manner.

In addition to the afore said description, FIG. 2 shows the correct positioning of the sharp barbed portion of the hook 40 or a small component tip inserted into the coil spring.

OPERATION

From the back side of the Hook 40, thread eight to ten inches of line through the eye. Then place the sharp point of a Hook 40 or a small components tip into the Hook Slot 11. Move the Hook 40 down the Hook Slot 11 until the sharp point is inserted into the Coil Spring 30. The eye of the Hook 40 should be positioned slightly to one side of the Hook Slot 11, this eases the final threading operation of the eye of the Hook 40. Grasp the tapered end of the Barrel Shaft 10 with one hand and the lose end of the line with the other hand. Wrap the lose end of the line around both the Barrel Shaft 10 and the exposed shank of the Hook 40 four or five times. Insert the lose end of the line back through the eye of the Hook 40. Grasp the upper portion of the Barrel Shaft 10 and the Cap 10a with the hand used in the wrapping and threading operation. Then grasp both lines with the hand that held the tapered end of the Barrel Shaft 10, and quickly pull both hands in opposite directions. The tension being applied to the line will start the Hook 40 sliding toward the tapered end, while simultaneously compressing the Coil Spring 30. The Coil Spring 30 provides resistance to movement of the Hook 40 allowing the wraps of line to slide over the exposed shank of the Hook 40 and off the tapered end of the Barrel Shaft 10. The line wraps will form a knot next to the eye of the Hook 40. Closer visual inspection will show the knot produced two wraps of line connecting it to the eye of the Hook 40.

Lay the excess line across the opening of the Line Cutter 21. Pull on the lose end of the line until the knot rests along the side of the Line Cutter 21. Pull the line in a downward motion; the sharp internal edge of the Line Cutter 21 will cut the line.

While the above description contains many specificities, these should not be construed as limitations on the scope of the invention, but rather one of many possible configurations. For example the Line Cutter 21 could be made in a triangle shape or just a hole with sharp edges. The Coil Spring 30 could be replaced with a plastic tube or a sponge. Accordingly, the scope of the invention should be determined not be the embodiment illustrated, but by the appended claims and their legal equivalents.

I claim:

1. A hand held device for holding and attaching a line to small components such as a fish hook comprising:
   (a) a first tapered, slotted pen barrel shaped member 10,
   (c) a second compression device member including a compression coil spring, said compression coil spring being enclosed inside of said tapered, slotted pen barrel shaped member, said compression coil spring being constructed and arranged for holding a barbed end of said hook in the slot of said slotted barrel while said line is being attached to the hook.

* * * * *